S. PAPP.
DIRECTION INDICATOR.
APPLICATION FILED JUNE 9, 1919.

1,324,977.

Patented Dec. 16, 1919.
2 SHEETS—SHEET 1.

Witness
H. L. Rogers

Inventor,
Stephan Papp,
By Howard O. Smith,
Attorney

S. PAPP.
DIRECTION INDICATOR.
APPLICATION FILED JUNE 9, 1919.

1,324,977.

Patented Dec. 16, 1919.
2 SHEETS—SHEET 2.

Inventor
Stefan Papp.
By Howard D. Smith,
His Attorney

Witness
H. L. Rogers

UNITED STATES PATENT OFFICE.

STEPHAN PAPP, OF DAYTON, OHIO.

DIRECTION-INDICATOR.

1,324,977.	Specification of Letters Patent.	Patented Dec. 16, 1919.

Application filed June 9, 1919. Serial No. 302,656.

*To all whom it may concern:*

Be it known that I, STEPHAN PAPP, a subject of the Emperor of Austria-Hungary, residing at Dayton, in the county of Montgomery and State of Ohio, have invented certain new and useful Improvements in Direction-Indicators, of which the following is a specification.

This invention relates to new and useful improvements in direction indicators.

The principal object of my invention is to provide a simple and efficient signal device that may be readily secured to the rear of an automobile or other vehicle, to indicate to the person behind, clearly and in ample time, the direction in which the vehicle is to be turned.

Another object of the invention is to provide a direction indicator which, in addition to indicating direction, will at all times project a light upon the automobile license number, and upon the ground around each rear wheel, to guide the driver at night in reversing the movement of his car.

It is still another object of the invention to display a green signal light at each side of the device, for the purpose of making each side of the automobile distinguishable at night.

Other important and incidental objects will be brought out in the following specification and particularly set forth in the subjoined claims.

Figure 1:
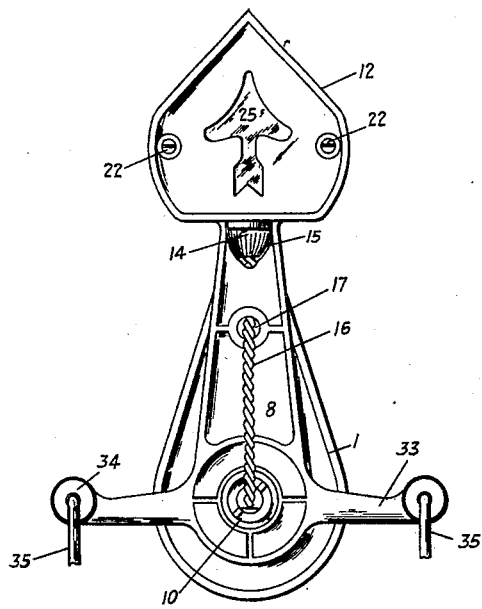
Figure 2:
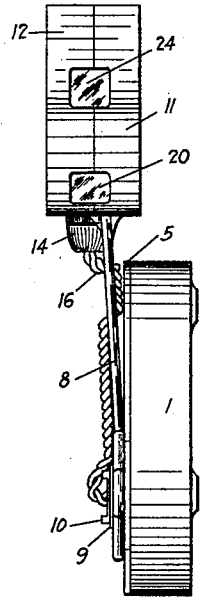
Figure 3:
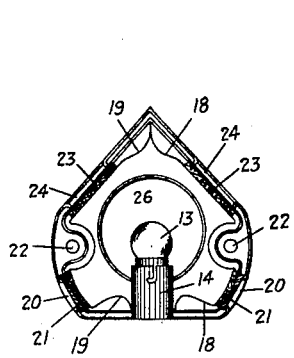
Figure 5:
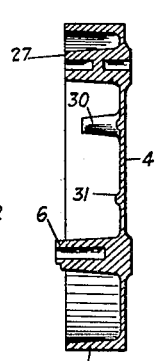
Figure 4:
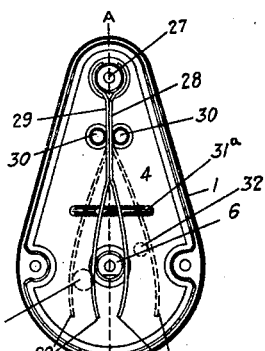
Figure 6:
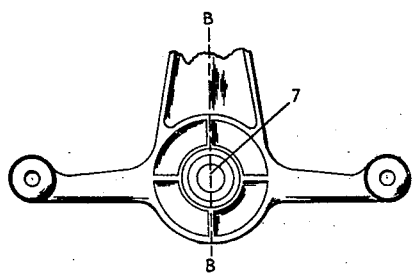
Figure 7:
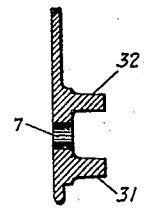
Figure 8:
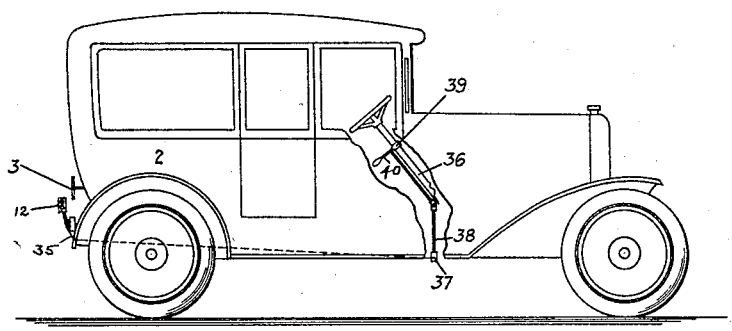
Figure 9:
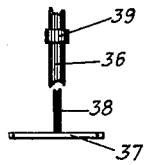

One form of embodiment of my invention is illustrated in the accompanying drawings, of which Figure 1 is a front view of my improved direction indicator. Fig. 2 is a side view thereof. Fig. 3 is a rear view of the head portion of the indicator arm. Fig. 4 is a front view of the interior portion of the hollow supporting member. Fig. 5 is a sectional view taken on the line A—A of Fig. 4. Fig. 6 is a front view of the lower portion of the indicator arm. Fig. 7 is a sectional view taken on the line B—B of Fig. 6, showing the projections on the rear on said arm. Fig. 8 is a side elevational view of an automobile equipped with my improved direction indicator. Fig. 9 is a detail front view of the control mechanism therefor.

Throughout the specification and drawings, similar reference characters denote corresponding parts.

Referring to the accompanying drawings, the numeral 1 designates a hollow supporting member that preferably has a semi-circular base portion and straight sides that taper inwardly to a semi-circular top, said member adapted to be secured to the rear portion of an automobile 2, or other vehicle, in front of a license plate 3. (See Fig. 8). The member 1, which preferably has an integral bottom 4, is provided with a removable cover 5.

Preferably integral with the bottom 4 of the member 1, and projecting outwardly to a point a short distance beyond the level of the outer rim of said member, is a stud or pivot pin 6, said pin also adapted to project through, and beyond, a wide opening in the cover 5. The outer end of the pin 6 is adapted to project through a hole 7 in the lower end of an indicator arm 8 for the purpose of supporting the latter during an oscillatory movement. A washer 9 is adapted to be slipped on the pin 6 beyond the arm 8, while the extreme outer end of said pin is adapted to receive a wire-receiving piece 10. (See Figs. 1, 2, 5, 6 and 7).

The indicator arm 8 terminates at its upper end in a hollowed out head-portion 11, preferably shaped like an arrow point, to which head-portion there is removably secured a similarly-shaped front portion 12. When secured together, the sections 11 and 12 form a head for the indicating arm 8 that is adapted to receive an incandescent lamp 13 which is secured in a socket 14 that projects into the bottom of said head. The lower portion of said socket seats in a recess 15 in the upper end of the arm 8, against the sides of which it is tightly pulled by the lead wires 16 that pass inwardly through said recess and again outwardly through a hole 17 in the upper portion of said arm, and then downwardly to the wire receiving piece 10 on the outer end of the pivot pin 6 (See Figs. 1 and 2).

Assisting the above construction in firmly holding the lamp socket 14 within the head portion of the indicator arm 8, are two springs 18 and 19. Referring to Fig. 3, these springs are oppositely disposed within the head portion of the indicator arm, their lower ends being curved to receive tightly between them the socket 14, to assist in firmly holding the latter within said head portion.

The springs 18 and 19 also serve to hold the following described lenses within the side walls of the head portion of the indicator arm 8. At each side of said head portion, just above its base, is a preferably rectangular opening 20 covered by a lens 21 of plain glass, which is held against the sides of said opening by wide projecting portions of the springs 18 and 19, as shown in Fig. 3. These lenses 21 serve to project the rays from the lamp 13 toward the ground around the rear wheels of the automobile, to assist the driver in reversing the motion of the car.

The springs 18 and 19 then project upwardly, curving around two connecting screws 22 between the front and rear portions of said head, and thence bearing firmly against two large lenses 23 that cover two side openings 24 in the upper portion of said head. These lenses are preferably constructed of green glass, since their function is to project the rays of the lamp 13 sidewise as a safety signal to passers-by. The springs 18 and 19 then project into engagement with each other at the top of the arrow-shaped head of the indicator arm.

In the front portion of the section 12 of the indicator-arm head, there is provided an arrow head opening 25 in front of the lamp 13, to project its rays toward the drivers of the cars behind, to denote clearly to them the direction in which said arm is moved at night. A circular opening 26 is provided in the rear portion of the section 11, just behind the lamp 13, to project a portion of its rays rearwardly upon the number or license plate 3, so that it may read plainly at night.

The indicator arm 8 has three stationary positions, the upright one, which indicates that the automobile is to continue on a straight course; one in which it is inclined about 45 degrees to the right, which indicates that the driver expects to turn to the right; and the other at about 45 degrees to the left, which indicates that the driver is going to turn to the left.

For the purpose of firmly holding the indicator arm 8 in any one of the above positions for a desired length of time, the following means are provided. Referring to Fig. 4, there is provided at the top of the supporting member 1, on its vertical axis, a large pin or stud 27 which is firmly gripped between the curved ends of two flat springs 28 and 29, which pass closely together between two studs 30 below the pin 27. The lower ends of the springs 28 and 29 preferably rest upon a short rib 31ª fixedly secured to the bottom of the member 1, terminating below said rib in two curved ends which tightly hug the pivot pin 6.

Referring to Fig. 7, the lower end of the indicator arm 8 has two rearward projections 31 and 32 which, when the said arm is mounted on the pin 6, pass through the opening in the cover plate 5 into the hollow supporting member 1, one on each side of the said pivot pin 6 between the lower ends of the springs 28 and 29. When the indicator arm is in its upright position, the said springs 28 and 29 will firmly embrace the projections 31 and 32 on said arm, to maintain it in said position until force is applied thereto to move it into one of its extreme side positions. And when it is moved into one of said extreme side positions, the springs will be sprung apart a sufficient distance by the said projections 31 and 32 to firmly grip them, and through them maintain said arm 8 in one of its extreme side positions until the latter is again moved. (See dotted lines in Fig. 4).

For the purpose of moving said indicator arm 8 from one indicating position to another, the following controlling means are provided, although any other suitable means for this purpose may be employed without departing from the spirit of the invention. Referring to Figs. 1 and 6, the arm 8 preferably has two lower side extensions 33 and 34, to the outer end of each of which a cable 35 may be attached. Each cable 35 runs to the front portion of the car, below the steering post 36, where it is connected to one end of a lever 37 fixedly secured at its central portion to the lower end of a jointed rod 38, which at its upper end is secured by a bracket 39 to the steering post 36. The rod is turned by an operating arm 40, which may be moved by the hand or knees of the driver to turn the indicator arm 8 to a desired indicating position through the cable and lever mechanism just described. (See Figs. 1 and 8). It is thus possible for the driver of the car, far enough in advance of the time he desires to make a turn, clearly to indicate to the driver of the car behind his decision and the direction which the turn will take—if to the right, the indicator arm will be moved to the right; and if to the left, the arm will be moved to the left.

Having described my invention, I claim:

1. A direction indicator comprising a hollow supporting member attachable to the rear portion of a vehicle, a stud projecting from the lower inner portion of one side of said member through and beyond an opening in its other side, a pointer having a hole in its lower end through which said stud is adapted to project for the purpose of supporting said pointer during an oscillatory movement, a hollow head on said pointer, means for moving said pointer from one extreme side position to the other, and an incandescent light in said hollow head portion, said head portion having an arrow shaped opening in front of, and a circular opening behind, said light, an opening at each side of said light, and an opening on each side of its vertical axis, below said light.

2. A direction indicator comprising a supporting member attachable to the rear portion of a vehicle, a pointer arm hingedly secured at its lower end to said supporting member, a hollow head portion on said pointer arm, a lamp socket projecting from a recessed portion of the pointer arm, into said hollow head portion through a hole in the bottom of the latter, a lamp in said socket, and lead wires for said lamp that pass upwardly along the front face of said pointer arm to a hole therein, thence through said hole and upwardly along the rear face of said pointer arm to said recessed portion therein, and thence through said recessed portion to said lamp socket, substantially as described.

3. A direction indicator comprising a supporting member attachable to the rear portion of a vehicle, a pointer arm pivotally secured at its lower end to said supporting member, a hollow arrow-shaped head portion on said pointer arm, an incandescent lamp within said head portion, said head portion having a side opening on each side of said lamp, a lens seated against the marginal edges of each opening, and a pair of oppositely disposed springs within said head portion, pressing against each lens and the lower portion of said lamp, to hold them firmly within said head portion.

4. A direction indicator comprising a supporting member attachable to the rear portion of a vehicle, a pointer arm pivotally secured at its lower end to said supporting member, a hollow arrow-shaped head portion on said pointer arm, an incandescent lamp within said head portion, said head portion having a side and a bottom opening on each side of said lamp, a lens seated against the marginal edges of each opening, and a pair of oppositely disposed springs within said head portion, in engagement with each other at the top, and pressing against said lenses and said lamp below their top portions, to hold said lenses and lamp firmly within said head portion.

In testimony whereof I have hereunto set my hand this 7th day of June, 1919.

STEPHAN PAPP.

Witness:
HOWARD S. SMITH.